May 10, 1966  T. M. KERSKER ET AL  3,250,641
METHOD OF PROCESSING TIRE CORDS, TIRE
CORD FABRIC, AND THE LIKE
Filed April 12, 1962
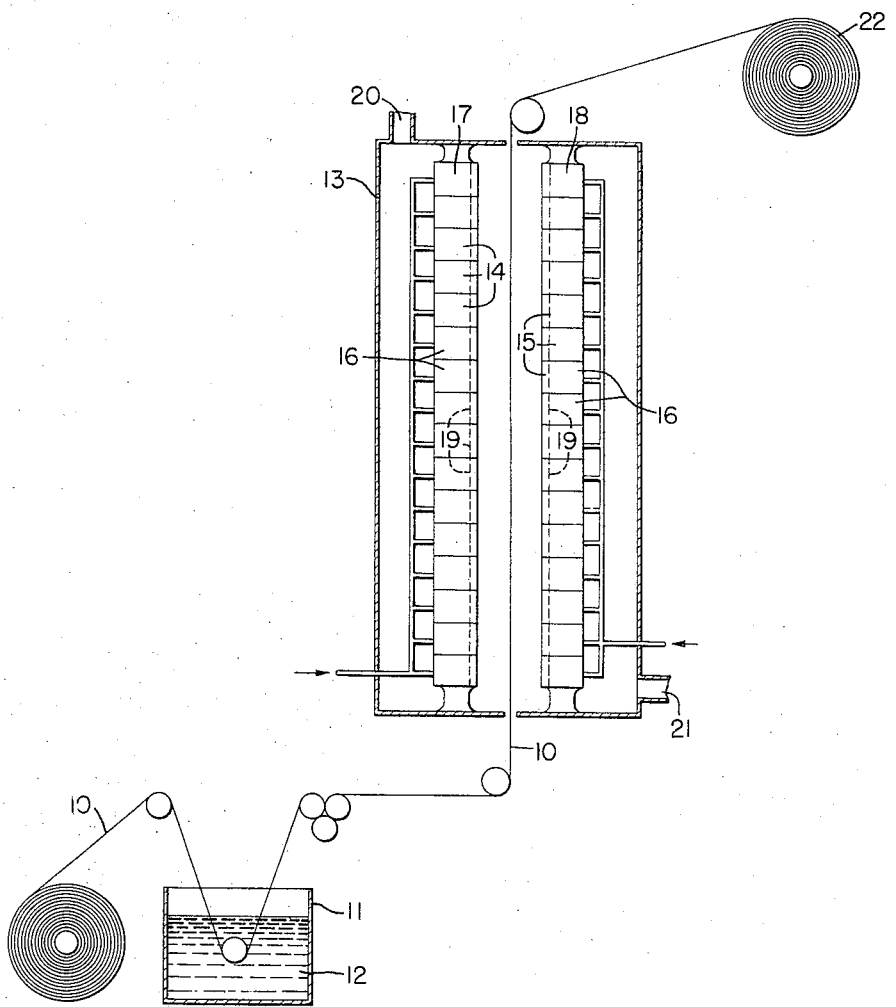
INVENTOR.
THEODORE M. KERSKER
BY    JESS W. MEHERG
J. B. Holden
ATTORNEY United States Patent Office 3,250,641
Patented May 10, 1966

3,250,641
METHOD OF PROCESSING TIRE CORDS, TIRE CORD FABRIC, AND THE LIKE
Theodore M. Kersker, Akron, and Jess W. Meherg, Tallmadge, Ohio, assignors to The Goodyear Tire & Rubber Company, Akron, Ohio, a corporation of Ohio
Filed Apr. 12, 1962, Ser. No. 186,948
4 Claims. (Cl. 117—93.31)

This invention relates to the treatment of textile yarns, cords, fabric, and the like to be used as reinforcements in the manufacture of tires, belting and similar products. More particularly, the invention relates to the method of impregnating such cords, yarns and/or fabric with a liquid cord to rubber bonding agent or adhesive and drying the same.

It is well known that before cords made of textile material can be incorporated into rubber articles, especially those to be subjected to drastic conditions of flexing or bending, the cords must be prepared by coating or impregnating the cords with an adhesive that will bond well to both rubber and the cords. Various adhesives having a base of latex, protein, or resin-forming materials which will produce good adhesion between the textile cord and rubber are known in the art. These adhesives, or bonding agents, are dispersed, dissolved, or suspended in a liquid vehicle into which the textile material is dipped and subsequently the wetted material is dried in an oven.

It is conventional practice to blow hot gasses or hot air through the drying oven at a relatively low temperature, usually below 300° F. This is necessary to insure that the moisture contained in the inner interstices of the dipped cord is evaporated at about the same rate as the moisture contained in the outer interstices of the cord, so that the adhesive on the surface and/or outer interstices of the cord does not form a skin or crust on the cord before the cord is completely dried. Because of the low drying temperature and the attendant low speed of operation, large capacity drying ovens have been necessary, requiring vast expenditures of capital and large factory areas for operation.

It has been recognized that if the temperature at which the cord is dried could be increased, preferably substantially higher than 300° F., the speed of drying could be substantially increased or the size and capacity of the drying ovens could be considerably reduced. However, this simply has not been possible heretofore, because in a hot air or hot gas oven operating at a temperature above 300° F., the heat transfer is such that the adhesive on the surface and radially outer interstices of the cord is raised to a higher temperature at a much faster rate than the adhesive existing in the internal interstices of the cord. This condition causes a considerable temperature gradient to exist through the cross section of the cord, so that a skin or crust forms on the cord which is subsequently ruptured by the escape of moisture from the internal interstices of the cord. This phenomena not only interferes with the adhesion of the cord to rubber but causes the skin or crust to form minute granules or particles which flake or sluff off onto subsequent processing apparatus. The particles and granules build up into thick layers on the subsequent processing rolls and in time the layers crack and large particles and/or pieces break off of the rolls and find their way into the tire or other articles built from the fabric. Alleviating the situation necessitates a very costly shut-down of the equipment and time consuming cleaning of the processing rolls thereof.

It is an object of this invention to provide a method of dipping and drying cord fabric at a very high temperature and speed without detriment to the adhesion of the fabric to rubber, and without causing any rupturing and flaking of the adhesive thereby avoiding any build-up of adhesive material on the rolls and other components of subsequent processing equipment.

Another object of the invention is to provide a vastly more economical process of dipping and drying a cord fabric at a very high temperature and/or speed without detriment to the adhesion characteristics of the cord and with uniform drying of the fabric.

Other objects and advantages of the invention will become apparent from the following specifications when read in conjunction with the accompanying drawings, in which FIG. 1 is an elevational schematic view of an apparatus for performing the method of this invention.

The term "cord fabric," unless otherwise modified, is intended to be used in its generic sense to include a fabric made of a warp, with or without a weft, with the warp made of twisted or untwisted bundles, plies, or yarns of natural or synthetic textile filamentary or staple material.

The method of treating cords by the present invention consists of first dipping the cord 10 into a tank or container 11 containing any well known cord to rubber bonding agent 12, dissolved, dispersed, or suspended in a liquid vehicle, preferably water. Any suitable bonding agent or adhesive may be used, such as, for example, (1) a rubber latex, (2) an aqueous dispersing solution of a resin, (3) an aqueous dispersion of a protein, or (4) mixtures comprising two or more of the above ingredients.

After the cord fabric 10 is dipped in the liquid cord to rubber-bonding agent 12, it is passed through a drying oven or chamber 13 having tiers 14 and 15 of infrared heat generators or units 16. Each tier has a width approximately as wide as the fabric 10 and the tiers 14 and 15 are arranged to form two banks 17 and 18 positioned, respectively, on each side of the cord fabric 10 as it passes through the chamber. The infrared units 16 may be either electrically energized resistant heating wire or calrod units producing infrared radiation but, preferably, the infrared units consists of gas fired infrared units or generators which produce infrared radiation primarily of long wavelengths. The units 16 are supplied with a combustible gas mixed with air and burned at approximately 1650° F. on the surface of a ceramic perforated mat 19 making the mat incandescent, as shown and described, for example, in U.S. Patent 2,775,294. As the fabric passes between the banks 17 and 18 of infrared heating units 16, it is heated to temperatures up to 600° F. in inverse ratio to the time of exposure of 3 to 40 seconds. The liquid vehicle of the cord to rubber bonding agent is thus evaporated and permitted to escape from the chamber through the vent 20 and, if desired, air is supplied to the chamber through the inlet 21. The fabric after passing through the chamber is conveyed to a wind-up roll 22 or to subsequent heat treating and/or other processing equipment.

Surprisingly, the adhesive coating on the cord fabric 10, after being treated in the manner described above, does not exhibit any tendency to form granules or particles of adhesive on the surface thereof which flake or sluff off onto subsequent processing apparatus and which interfere with the subsequent adhesion of the cord to rubber. This is true, despite the fact that the fabric 10 has been exposed to very high temperatures and dried in a short interval of time. It is believed that these results are obtained by reason of the fact that both sides of the fabric 10 are exposed to infrared radiation of an array of wavelengths, primarily above approximately 20 microns. The infrared absorption rates of the liquid vehicle, the adhesive, and the cord fibers are such that the moisture existing in the internal interstices of the cord is heated and evaporated within the time period necessary to cure the adhesive on the surface of the cord. Therefore, moisture is evaporated from the innermost interstices of the cord and is permitted to escape therefrom before the adhesive existing at the lateral surfaces of the cord is dried and/or cured sufficiently to form a skin or crust entrapping the moisture.

While certain representative embodiments and details have been shown for the purpose of illustrating the invention, it will be apparent to those skilled in this art that various changes and modifications may be made therein without departing from the spirit or scope of the invention.

What is claimed is:

1. A method of treating a cord fabric comprising the steps of:
   (1) applying a liquid coating of a cord-to-rubber bonding agent to said fabric,
   (2) moving said fabric past an open flame infrared emitting source,
   (3) drying said bonding agent on said fabric by utilizing infrared radiation primarily of long wavelengths obtained from said gas-fired ceramic mat.

2. A method of treating a cord fabric comprising the steps of:
   (1) applying a liquid coating of a cord-to-rubber bonding agent to said fabric,
   (2) moving said fabric past an open flame infrared emitting source,
   (3) drying said bonding agent on said fabric for a time period of from 3 to 40 seconds by utilizing infrared radiation primarily of long wavelengths obtained from said gas-fired ceramic mat.

3. A method of treating a cord fabric comprising the steps of:
   (1) applying a liquid coating of a cord-to-rubber bonding agent to said fabric,
   (2) moving said fabric past an open flame infrared emitting source,
   (3) drying said bonding agent on said fabric for a time period of from 3 to 40 seconds by utilizing infrared radiation primarily of long wavelengths obtained from said gas-fired ceramic mat having a temperature of approximately 1650° F.

4. A method of treating a cord fabric comprising the steps of:
   (1) applying an aqueous liquid coating of a cord-to-rubber bonding agent to said fabric,
   (2) moving said fabric past an open flame infrared emitting source,
   (3) drying said bonding agent on said fabric for a time period of from 3 to 40 seconds by utilizing infrared radiation primarily of long wavelengths obtained from said gas-fired ceramic mat having a temperature of approximately 1650° F.

References Cited by the Examiner

UNITED STATES PATENTS

| | | | |
|---|---|---|---|
| 2,444,064 | 6/1948 | Philipp | 117—7 |
| 2,445,443 | 7/1948 | Long | 34—4 |
| 2,576,319 | 11/1951 | Toulmin et al. | 118—642 |
| 2,689,806 | 9/1954 | Dalton et al. | 117—139.4 |
| 2,846,752 | 8/1958 | Lessig | 28—72 |
| 2,881,732 | 4/1959 | Chrystman | 117—7 |

RICHARD D. NEVIUS, *Primary Examiner.*

JOSEPH B. SPENCER, *Examiner.*

A. R. NAVARO, A. H. ROSENSTEIN,
*Assistant Examiners.*